(12) United States Patent
Meggiolan et al.

(10) Patent No.: US 7,748,790 B2
(45) Date of Patent: *Jul. 6, 2010

(54) RIM AND SPOKE CONNECTION ON A SPOKED WHEEL FOR A BICYCLE

(75) Inventors: Mario Meggiolan, Creazzo (IT); Maurizio Passarotto, Rovigo (IT)

(73) Assignee: Campagnolo S.R.L., Vicenza (IT)

( * ) Notice: Subject to any disclaimer, the term of this patent is extended or adjusted under 35 U.S.C. 154(b) by 13 days.

This patent is subject to a terminal disclaimer.

(21) Appl. No.: 12/183,530

(22) Filed: Jul. 31, 2008

(65) Prior Publication Data

US 2009/0026833 A1 Jan. 29, 2009

Related U.S. Application Data

(63) Continuation of application No. 10/663,560, filed on Sep. 15, 2003, now Pat. No. 7,448,696.

(30) Foreign Application Priority Data

Nov. 21, 2002 (EP) .................................. 02425714

(51) Int. Cl.
  *B60B 21/06* (2006.01)
(52) U.S. Cl. .................. 301/58; 301/95.106; 29/894.33
(58) Field of Classification Search .................... 301/55, 301/58, 95.104, 95.106, 104, 110.5; 29/894.33, 29/894.333
See application file for complete search history.

(56) References Cited

U.S. PATENT DOCUMENTS

| 603,956 | A | * | 5/1898 | Jeffery ........................ 152/383 |
| 2,937,905 | A | | 5/1960 | Altenburger |
| 5,975,646 | A | | 11/1999 | Campagnolo |
| 6,568,766 | B1 | * | 5/2003 | Okajima et al. ........ 301/95.104 |
| 6,890,040 | B2 | * | 5/2005 | Chen ........................... 301/58 |
| 2001/0019222 | A1 | | 9/2001 | Campagnolo |
| 2008/0054713 | A1 | * | 3/2008 | Spahr et al. ................... 301/58 |

FOREIGN PATENT DOCUMENTS

| DE | 4127500 C1 | | 10/1992 |
| DE | 4212094 A1 | | 10/1993 |
| DE | 4444044 A1 | | 6/1996 |
| EP | 0896886 A1 | | 2/1999 |
| EP | 1101631 A1 | | 5/2001 |
| EP | 1167078 A1 | | 1/2002 |
| EP | 1207053 A2 | | 5/2002 |
| EP | 1231077 B1 | | 5/2006 |
| JP | 60038201 A | * | 2/1985 |
| JP | 63025101 A | * | 2/1988 |

* cited by examiner

OTHER PUBLICATIONS

EP Search Report for Appln. 02425714 Apr. 7, 2003.

*Primary Examiner*—Russell D Stormer
(74) *Attorney, Agent, or Firm*—Volpe and Koenig, PC

(57) ABSTRACT

A spoked wheel for a bicycle includes a rim, a hub, a plurality of spokes tensioned between the rim and the hub, each provided with a spoke attachment element for attachment to the rim, a plurality of seats, such seats being openings formed in the rim, each for housing one of said spoke attachment elements. The shape and size of the spoke attachment elements and of the seats of the rim are such that: the spoke attachment element is suitable for taking up a first configuration in which its insertion through the seat is possible; and the spoke attachment element once inserted in the seat assumes a second configuration in which it is not possible to remove the spoke attachment element through the seat.

17 Claims, 12 Drawing Sheets

RIM AND SPOKE CONNECTION ON A SPOKED WHEEL FOR A BICYCLE

CROSS REFERENCE TO RELATED APPLICATION(S)

This application is a continuation of U.S. application Ser. No. 10/663,560 filed Sep. 15, 2003, now U.S. Pat. No. 7,448,696, which is incorporated by reference as if fully set forth.

FIELD OF INVENTION

The field of invention for the spoked wheel described herein is bicycle wheels, rims, and spokes.

BACKGROUND

A spoked wheel for a bicycle comprises a peripheral crown or rim, a central hub and a plurality of spokes extending between the hub and the rim, the tension of which must preferably be adjustable at the hub and/or at the rim.

To allow tension adjustment, usually a threading is provided at an end of the spokes and a threaded hole attachment is provided at the hub or the rim, respectively. The second end of the spokes can be provided with a second threading or a head, for example rectangular or circular, housed in a suitable seat, for example hooked in a hub flange or inserted in a bayonet coupling at the rim, respectively.

Rims having a channel, with fins where the beads of the tire are coupled and at the base of which a plurality of holes are made, are known. The holes receive a spoke attachment element provided with a hole with a shaped seat or with a threaded hole. The length of the hole threading of the spoke attachment element can be equal to the spoke threading, or else longer to also allow tension adjustment of the spoke by varying the screwing in depth of the spoke in the threaded hole of the spoke attachment element.

The spoke attachment elements are also called "nipples", if they allow the tension adjustment of the spoke, or else "barrels" if they do not allow this.

Such type of single channel rims have low structural stiffness and therefore greater deformability from lateral and radial loads. Moreover, such single channel rims are not suitable for use with tubeless tires since the coupling channel is not airtight.

To increase structural stiffness, rims having a circumferentially external tire coupling channel and a circumferentially internal spoke attachment chamber are also known. More specifically, such rims are made up of two side walls connected or filleted to one end by a circumferentially internal wall or lower bridge and at an intermediate point by a circumferentially external wall or upper bridge or partition, so as to have a substantially inverted A-shaped cross-section. The circumferentially external portions of the side walls, typically provided with a border, form the tire coupling channel with the upper bridge or partition, whereas the circumferentially internal portions of the side walls form, with the lower bridge and the upper bridge, a spoke attachment chamber.

Instead of a single chamber, two or more chambers can be provided through one or more partition walls, extending substantially parallel to the upper bridge or substantially transverse to it. Each wall (upper bridge, lower bridge, side and partition walls), can also be shaped in various ways, forming an even remarkably complex cross section of the rim.

Rims of this type can be manufactured by casting of carbon fibre (see for example the European patent application of the same Applicant published with No. 1.231.077 A2). Alternatively, such rims are manufactured by extrusion of an aluminum profiled bar. The profiled bar is shaped as a circle typically by calendaring and its terminal ends are joined by welding, for example flash welding or TIG welding, by cementing after insertion of a metallic sleeve, by pin-connection or otherwise.

In this type of rims there is the problem of how to attach spokes in respective spoke attachment seats provided in the spoke attachment chamber(s), normally through the aforementioned spoke attachment elements.

In a first solution, described in U.S. Pat. No. 5,975,646 of Campagnolo, this is carried out by forming a plurality of access openings in the upper bridge, each at a respective spoke attachment seat. Such access openings allow insertion of the spoke attachment elements (nipples or barrels) and of the tool for screwing them onto the spokes or for holding them during the attachment of the spokes. To preserve a suitable structural stiffness of the rim, the upper bridge must however be formed with increase thickness, with a consequent undesirable weight increase of the rim. Moreover, such a rim is not suitable for tubeless tires since the tire coupling channel is not airtight due to the aforementioned access openings.

US patent application US2001/0019222 A1 of Campagnolo, to avoid this and to provide a rim in which the upper bridge has only the hole for the inflation valve for the tire and therefore sufficiently rigid and light, as well as suitable for use with tubeless tires, proposes to use supports having a seat for supporting a respective nipple at least partially outside of the rim section. Each nipple support more specifically comprises a substantially U-shaped bracket having said seat and hung on a pivot extending transversely between a pair of non-threaded holes formed in the side walls of the circumferentially internal chamber, or in flanges protruding from the side walls of the circumferentially internal chamber.

Regarding such a solution, the Applicant observes that, besides the nipples, additional elements are necessary, with consequent additional assembling steps and greater weakness points in the wheel.

Other known solutions for providing a rim in which the upper bridge has just the hole for the inflation valve of the tire and therefore sufficiently rigid and light, as well as suitable for use with tubeless tires, are described in European patent applications EP 0 896 886 A1, EP 1 101 631 A1, EP 1 167 078 A1, all of Mavic S. A. In all three of such documents it is proposed to form the spoke attachment seats as threaded holes in which to screw, from the outside of the chamber, a threaded end of a spoke, a spoke attachment element such as a nipple or a barrel, or an insert in which to insert a nipple or a barrel. Since the thickness of the rim walls must be small for weight reasons, it is necessary to form the threaded holes by material deformation, so that a "chimney" is created in which a threading of the required length can be formed.

Regarding these solutions, the Applicant observes that they are very complex and expensive since forming the threaded holes in the lower bridge or in any case in the walls of the circumferentially internal chamber is a difficult and complex process.

Therefore, a simple and cost-effective solution to manufacture a spoked wheel for a bicycle, sufficiently strong whilst still being light, is still desirable.

SUMMARY

A spoked wheel for a bicycle comprising a rim, a hub, a plurality of spokes tensioned between the rim and the hub, and a plurality of seats. Each spoke is provided with a spoke attachment element for attachment to the rim. The plurality of seats are openings formed in the rim that house one of said spoke attachment elements. The shape and size of the spoke attachment elements and of the seats of the rim are such that the spoke attachment element is suitable for taking up a first configuration in which its insertion through the seat is possible; and the spoke attachment element inserted in the seat is in a second configuration in which it is not possible to remove such a spoke attachment element through the seat.

BRIEF DESCRIPTION OF THE DRAWINGS

Further characteristics and advantages of the spoked wheel shall become clearer from the following description of some embodiments thereof, made with reference to the attached drawings. In such drawings.

DETAILED DESCRIPTION OF THE PREFERRED EMBODIMENT(S)

Figure 6:
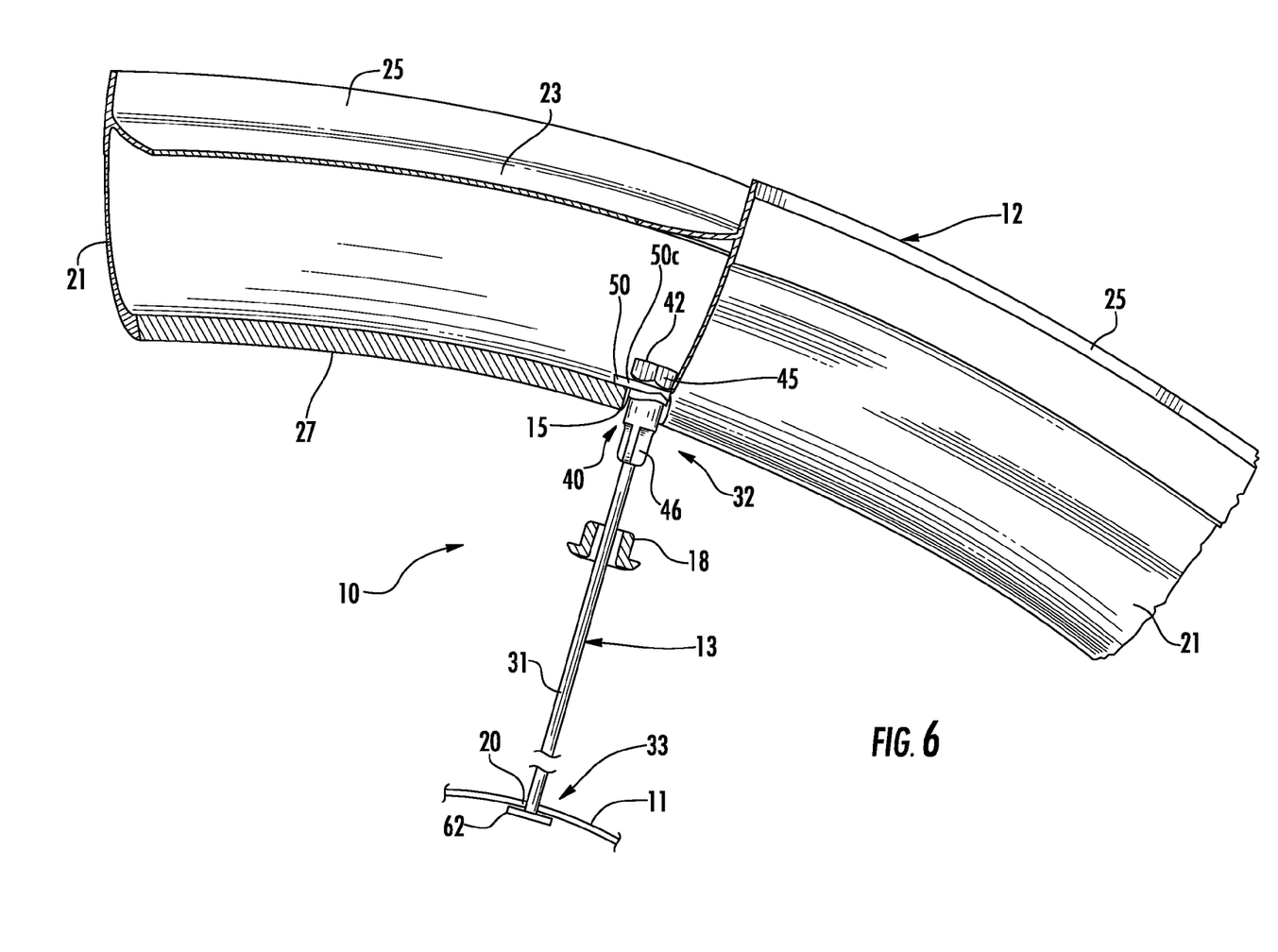
FIG. 6 is a perspective view of the portion of wheel of FIG. 5 viewed from a different angle, at the end of the assembling step.
Figure 13:
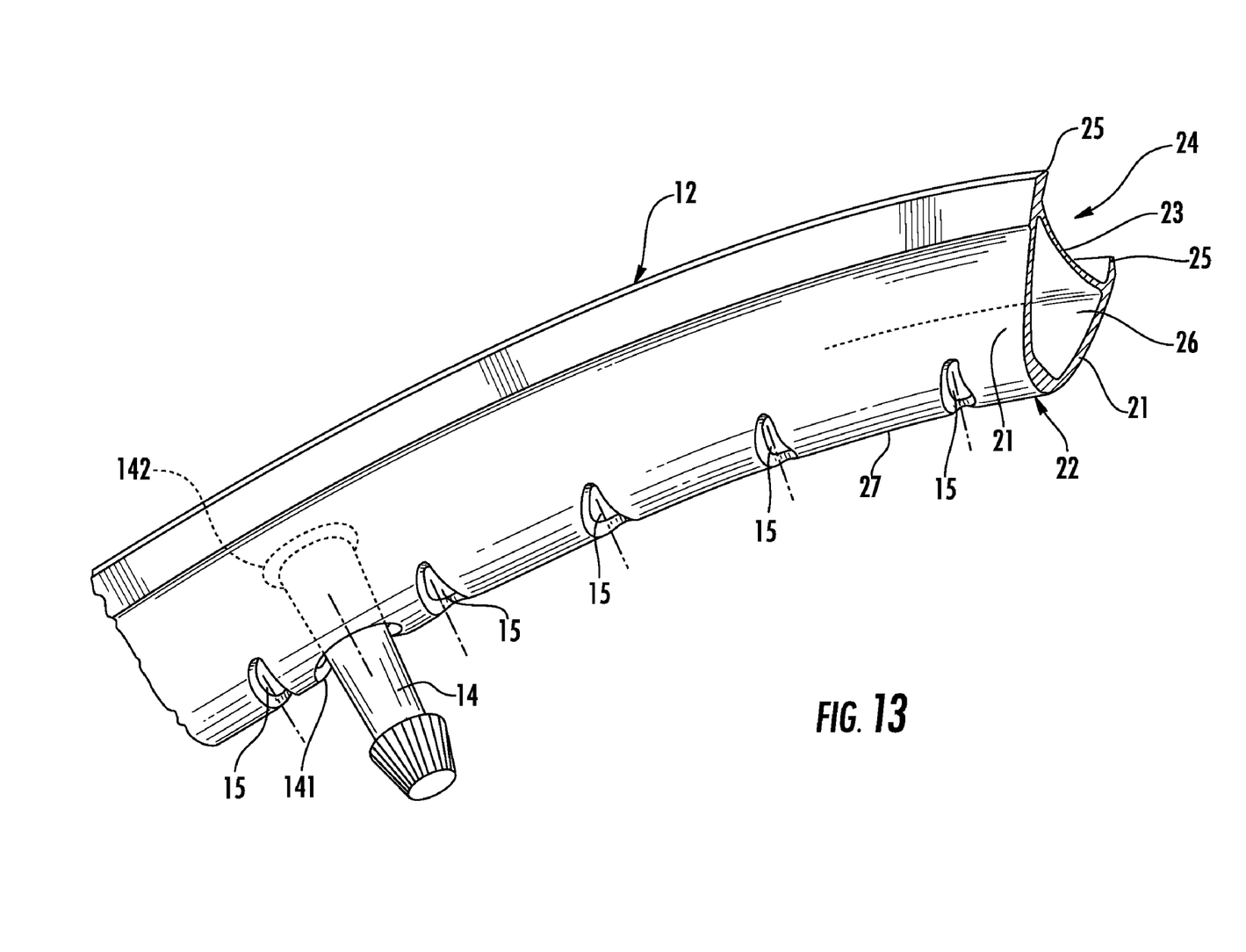
FIG. 13 is a partial perspective section view of a rim according to the invention.

In the Figures (in particular, see FIGS. 6 and 13), a spoked wheel 10 for a bicycle includes a hub 11, a rim 12 and a plurality of spokes 13, connected in tension between the rim 12 and the hub 11. The rim 12 has a profiled structure having a substantially inverted A-shaped section, with two sides 21 which converge and are joined together to form a base 22, and a bridge 23 extending between the two sides 21. Thus an outer peripheral channel 24 for coupling to a tire, which is defined by the bridge 23 and by tire-holding fins 25 formed from the radially outer portions of the sides 21, and an inner chamber 26, defined by the bridge 23 and by the base 22, are defined on the rim 12. It should be noted that the base 22 is not only defined as the inner peripheral joining zone 27 between the two sides 21 (which in turn can be relatively narrow as in the illustrated example or narrower or wider), but more generally the portion of the sides 21 below the bridge 23.

The rim 12 is provided with an inflation valve mounted in respective aligned holes 65 and 66, the first formed in the base 22, the second in the bridge 23. It should be noted that if a tubeless tire (not illustrated) is mounted on the wheel 10, the valve 14 is mounted airtight on the hole 66. If, on the other hand, a non-tubeless tire, with an inner tube is provided, the valve 14 is associated with the tube itself.

In accordance with the invention, the rim 12 is also provided with a plurality of seats 15 for coupling to the spokes 13, consisting of openings arranged in a regular manner along the base 22. In the preferred example illustrated, such seats 15 are linearly aligned with each other at the inner peripheral zone 27. Alternatively, two or more series of seats, staggered on the base 22, can be provided. More generally, the number and distribution of the seats 15 for coupling to the spokes 13 can vary. For example, the seats 15 could be grouped together in groups of two, three or four and/or could be made on many planes, different from the middle plane of the rim 12. The seats 15 have an elongated shape, in a transverse direction with respect to the circumferential direction of extension of the rim 12. Alternatively, the seats could be elongated in any direction and they could be orientated so as to help the attachment of the spokes with different inclinations.

Each of the spokes 13 comprises an elongated stem 31 and is provided at the opposite ends with two spoke attachment elements, one spoke attachment element 32 facing towards the rim 12 and another spoke attachment element 33 facing towards the hub 11.

The spoke attachment elements 32 and 33 can take on different configurations according to the different embodiments of the invention. In the preferred embodiment, shown in FIGS. 1-6, the spoke attachment element 32 includes a nipple 40 and a plate 50.

The nipple 40 has a shank 41, elongated in the direction of the spoke 13 to which it is coupled, and a head 42 protruding from the shank 41. The shank 41 is provided with a threaded axial inner hole 43, in a screw-adjustable coupling to a corresponding threaded portion 34 of the stem 31 of the spoke 13. The head 42 has a smooth conical contact surface 44 that is held against the plate 50 when the plate 50 is held within the rim 12, and a polygonal peripheral surface 45. The shank 41 also has a polygonal peripheral surface 46, which can be operated or turned with a suitable key.

Figure 5:
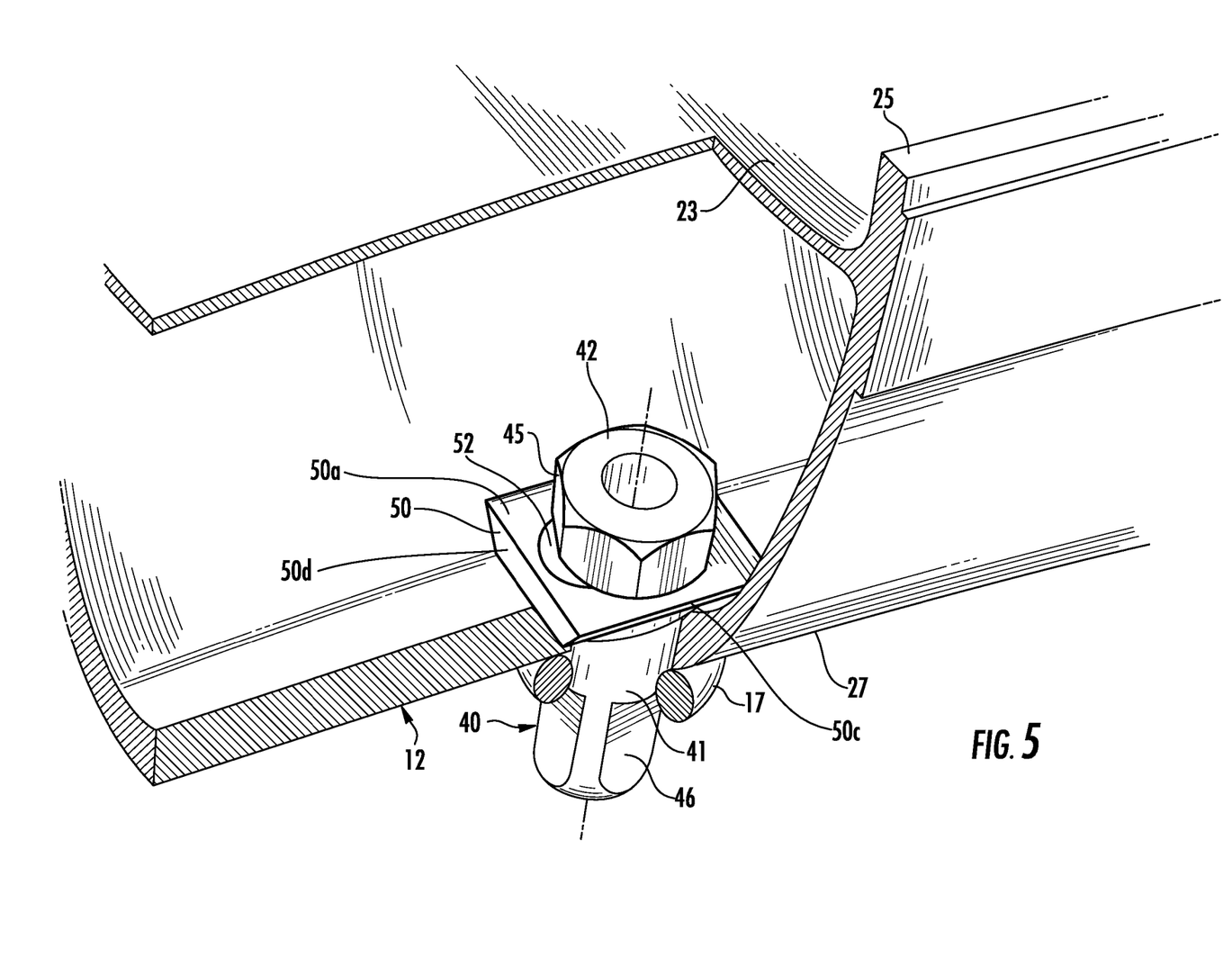
FIG. 5 is a perspective view of the portion of wheel of the previous Figures in a third step during assembling.
Figure 7:
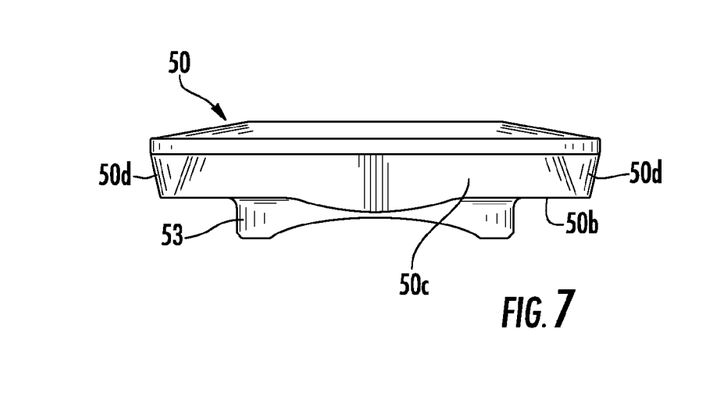
FIGS. 7 and 8 are views of the plate illustrated in the wheel of FIGS. 1-6.
Figure 8:
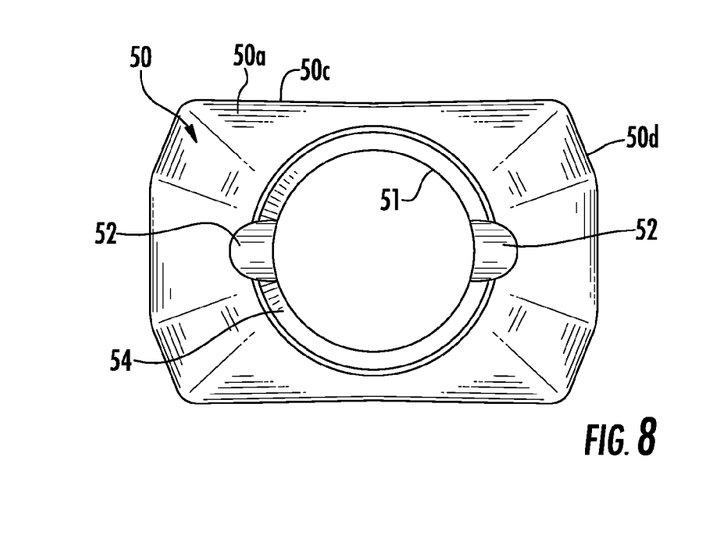

The plate 50 (also see FIGS. 7 and 8) has a flattened rectangle overall configuration having opposed faces 50a, 50b separated by edges 50c, 50d, with an inner hole 51, flanked by notches 52, or else cuts extending from the hole 51 towards the outside of the plate. More precisely, such cuts are oriented in the direction of the largest dimension of the plate 50, and they have a function linked to wheel assembling, as shall be seen hereafter. Around the inner hole 51, from the side facing towards the seat 15, the plate 50 is provided with a collar 53, which protrudes from the plate 50 itself and is housed in the seat 15. Around the collar 53, the plate 50 is preferably shaped to match the inner shape of the base 22 of the rim 12. On the other side, conversely, around the same inner hole 51, the plate 50 has a smooth conical contact surface 54 to the nipple 40, in contact engagement with the corresponding conical surface 44 of the nipple 40. Given the contact between the two conical surfaces 44 and 54, the nipple 40 is free to rotate about the axis of the spoke 13, even when the spoke 13 is tensioned. The plate 50, instead, is not free to rotate with respect to the rim 12, being shaped so as to match the inner shape of the base 22 of the rim 12. As best seen in FIG. 5, the plate 50 can be properly oriented in two positions, one as shown, and a second rotated 180 degrees about the axis of the nipple 40. The proper orientation in either of these two positions is with the plate sides 50cc against the rim sides 21 and with the bottom face 50b against peripheral joining zone 27.

Preferably, slideable sealing gaskets 18 are provided (preferably made from rubber), of a suitable shape and size which, after attaching the spokes 13 to the rim 12, are positioned to seal the seats 15 and close any gap between the seat opening 15 and the nipple 40. Alternatively, gaps could be sealed with a suitable material, for example silicone. In this way, external agents like water, dust, etc., are prevented from entering into the rim 12 of the wheel 10.

Figure 9:
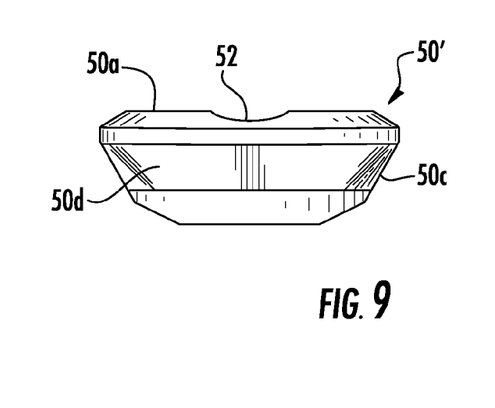
FIGS. 9 and 10 are views of a different plate.
Figure 10:
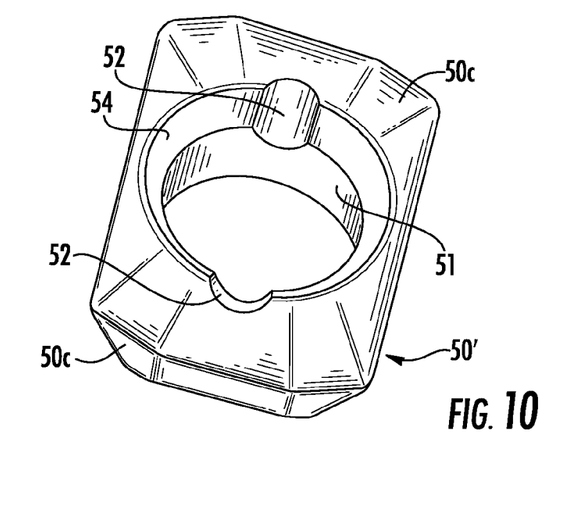

FIGS. 9 and 10 illustrate a different embodiment of a plate, numbered with 50', without a collar but provided with the other characteristics described above (and indicated by the same reference numerals). Of course, other shapes could be used as well.

Figure 11:
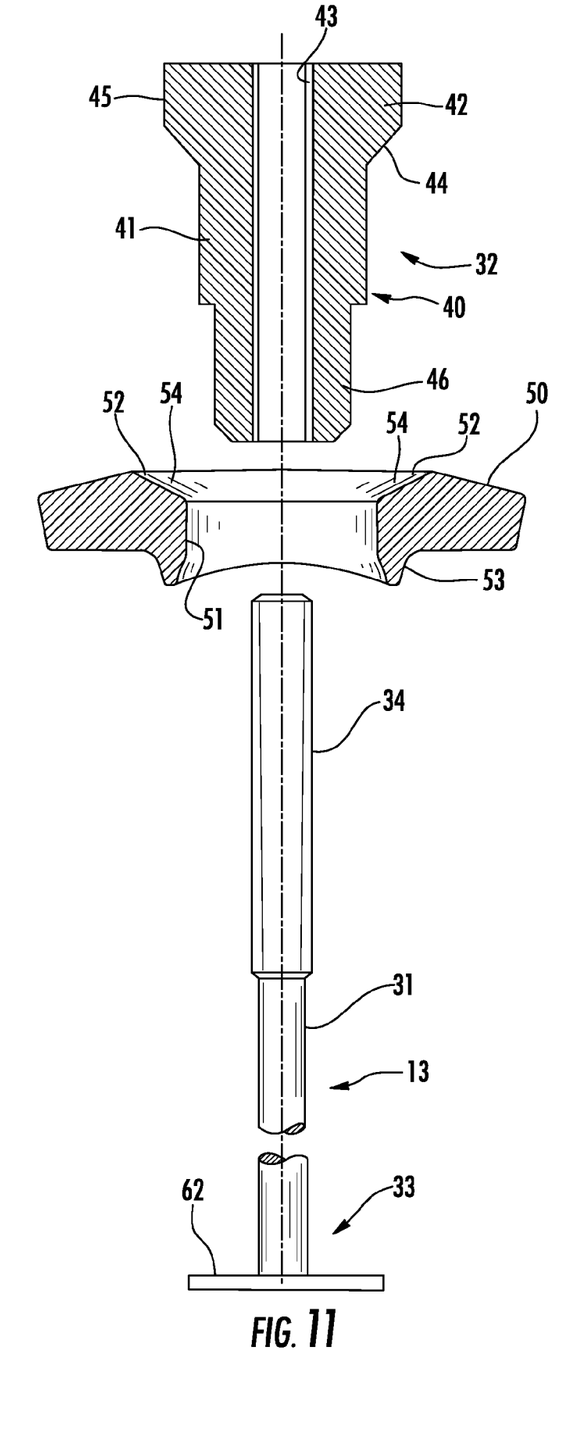
FIG. 11 is a section view of a spoke and its attachment elements in the wheel of FIGS. 1 to 8.
Figure 12:
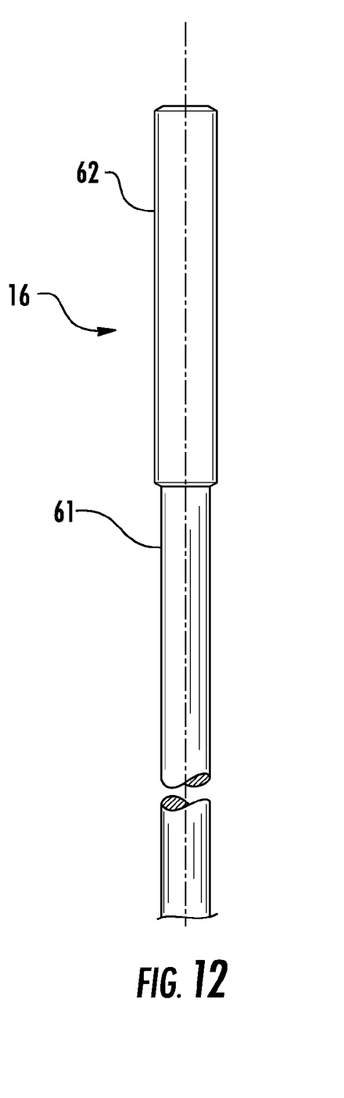
FIG. 12 is a section view of a false spoke used in assembling a wheel according to the invention.

As seen in FIGS. 11 and 12, the spoke attachment element 33 comprises a simple widened flattened head 62, protruding with respect to the stem 31 and formed integral with it.

Assembling of the just described wheel 10 preferably takes place in the following way, with the help of a false-spoke 16, which comprises a stem 61 with a threaded portion 74 analogous to the threaded portion 34 of the stem 31 of a spoke 13. In particular, see FIGS. 1-4.

Initially, the spoke attachment elements 32 are provided. In this step, to ease the subsequent steps, the nipple 40 with the plate 50 (correctly inserted on the shank 41 of the nipple 40) is mounted on the false-spoke 16. By displacing the plate 50 above the false-spoke 16, it is possible to incline the plate 50 itself and hold it inclined against the false-spoke 16, arranging it with its long side along the false-spoke 16 and exploiting the clearance between the hole 51 and the stem 31 and the notches 52. This condition, illustrated in FIGS. 1-4, corresponds to a first configuration of the spoke attachment element 32, in which it is possible to insert the spoke attachment element 32 in the inner chamber 26 of the rim 12 through the seat 15. Indeed, the plate 50 inclined in the aforementioned manner has a formation compatible with the seat 15, as illustrated in detail mainly in FIGS. 3 and 4.

Figure 1:
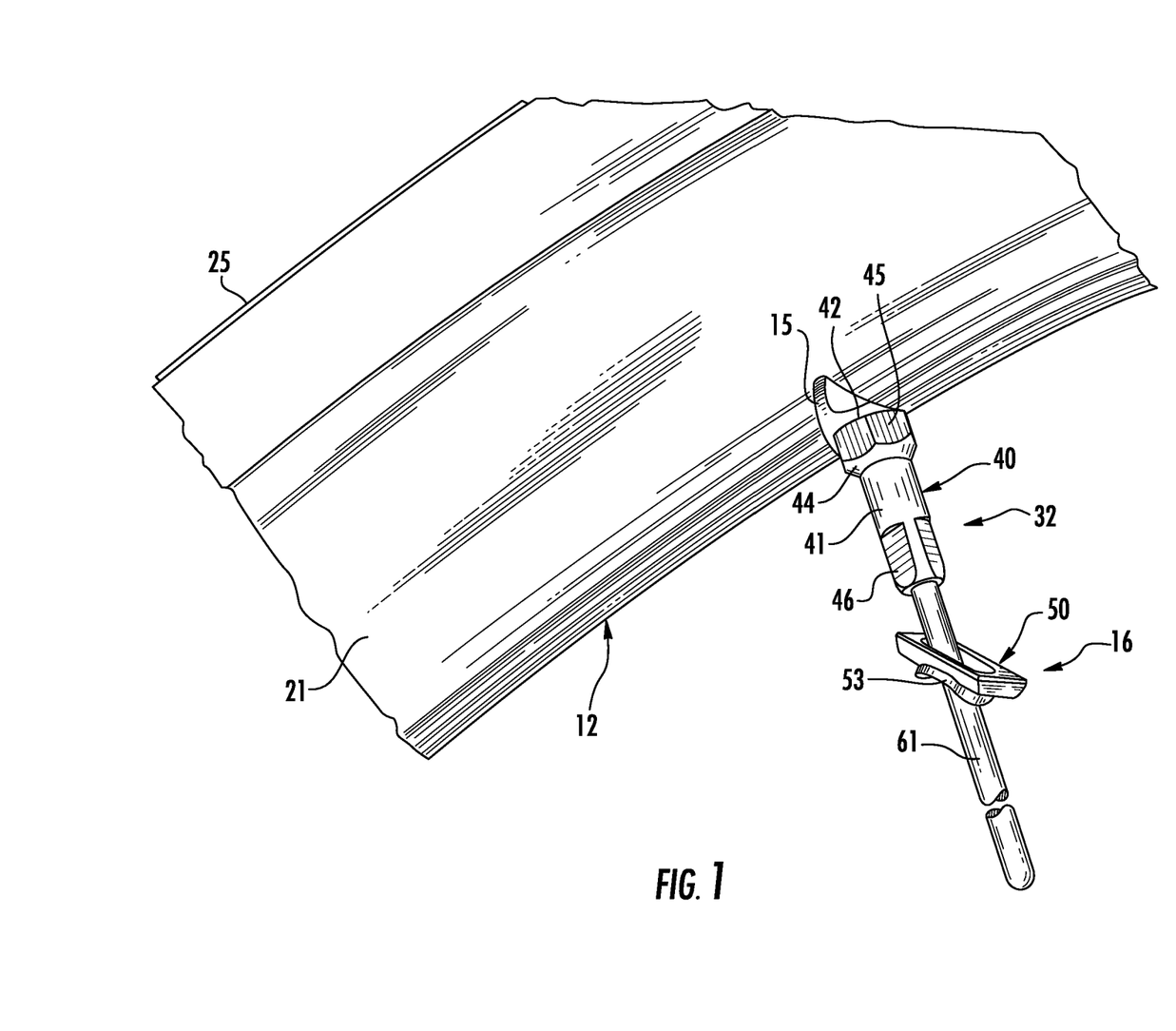
FIG. 1 is a perspective view of a portion of the wheel described herein, in a first step during assembling.
Figure 2:
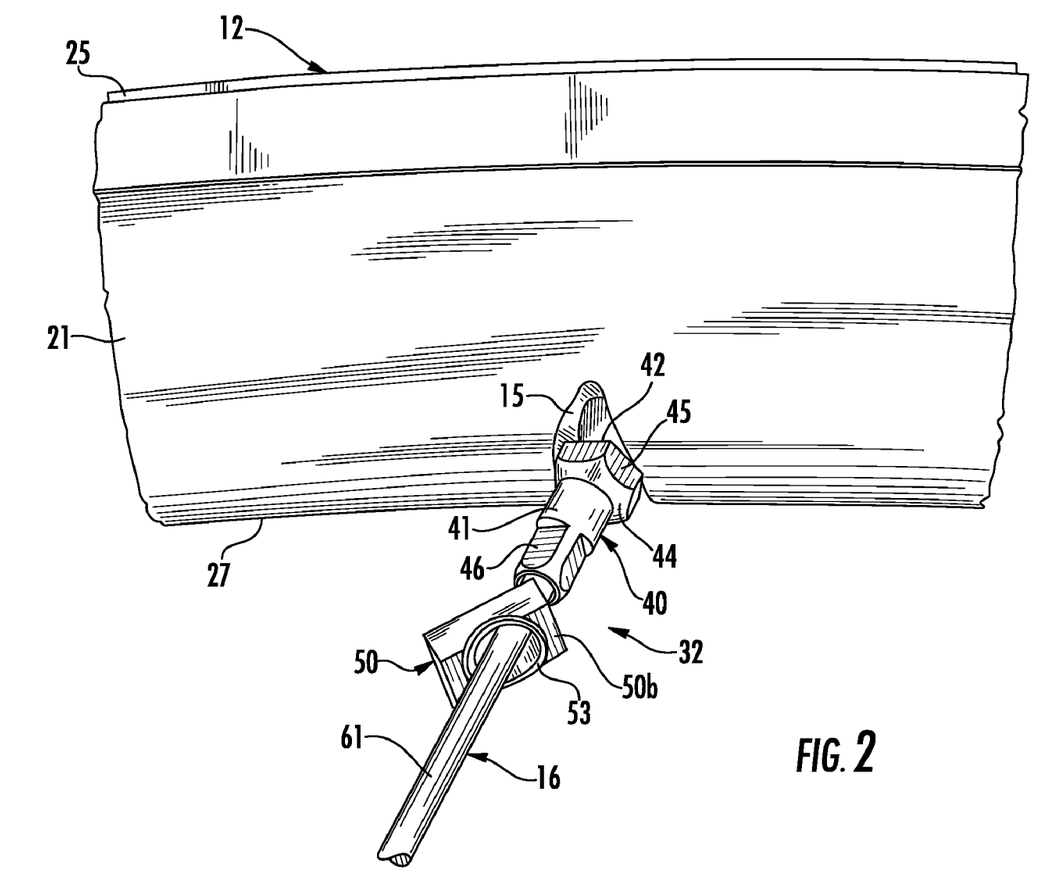
FIG. 2 is a further perspective view of the portion of wheel of FIG. 1 in the same first step during assembling, viewed from a different angle.
Figure 3:
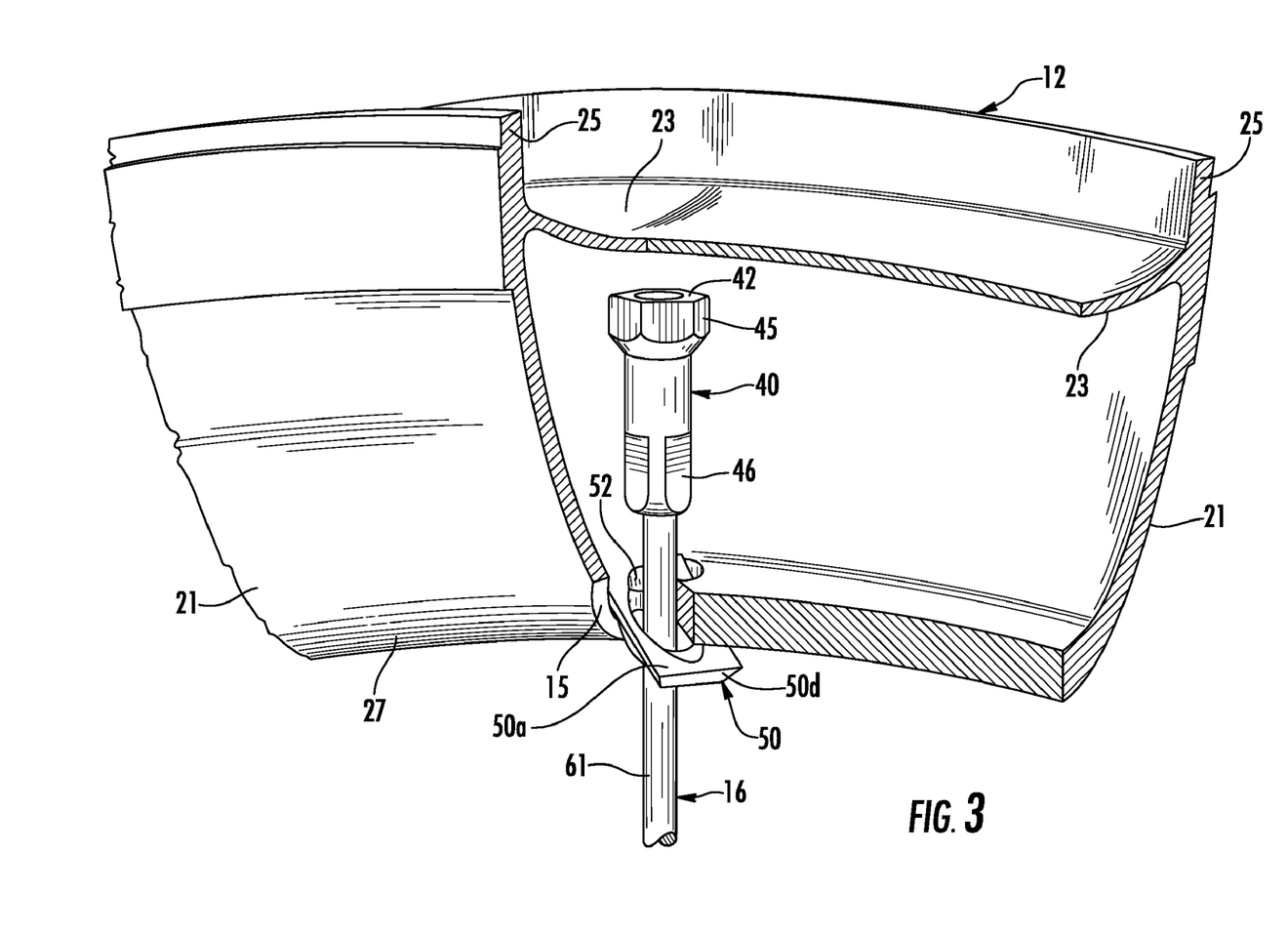
FIG. 3 is a partially sectioned perspective view of the portion of wheel of FIGS. 1 and 2 in a second step during assembling.
Figure 4:
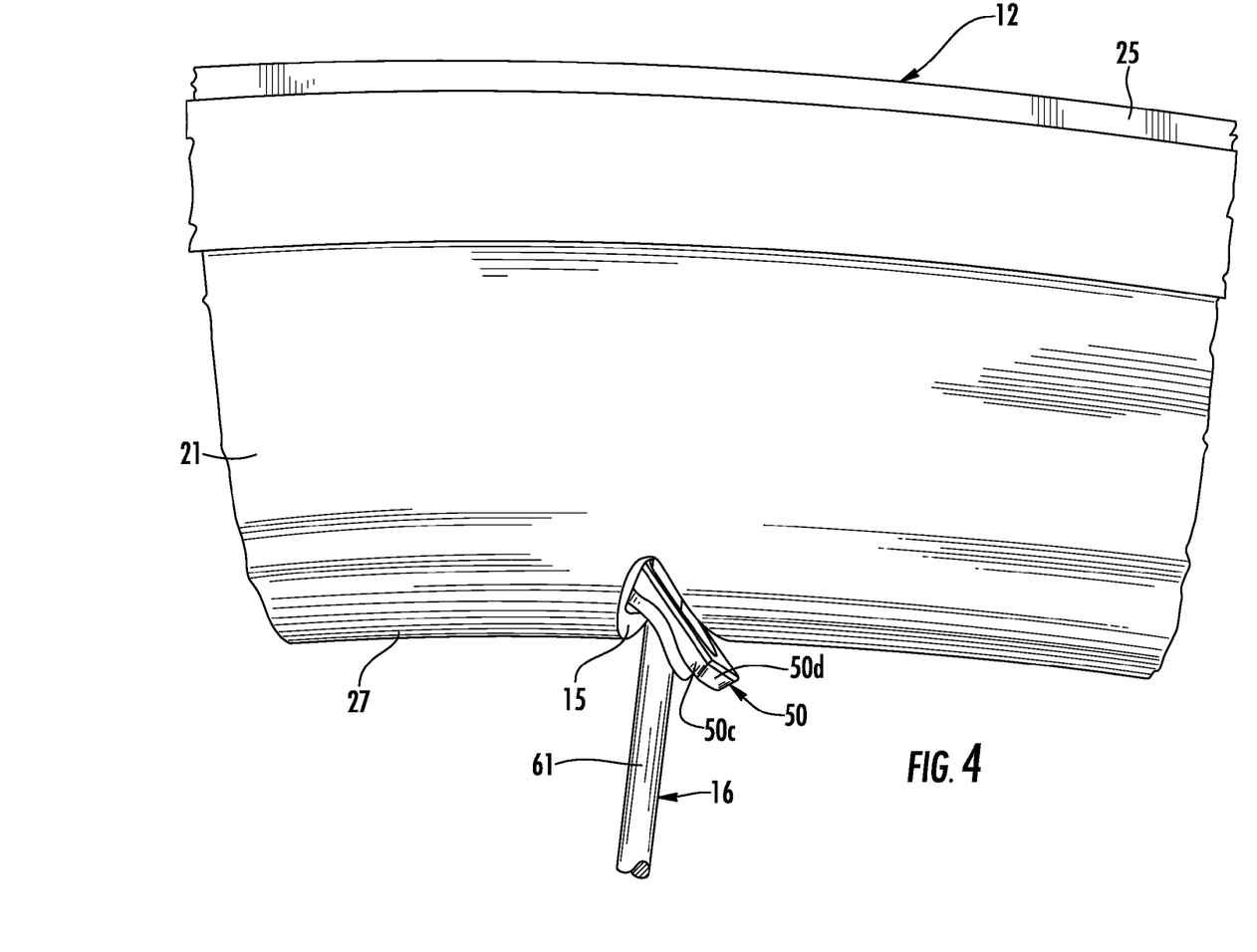
FIG. 4 is a perspective view of the portion of wheel of FIG. 3 in the same second step during assembling.

When the plate 50 with the rest of the spoke attachment element 32 is completely inserted in the inner chamber 26, releasing the plate 50 causes it to change orientation so that it falls across the seat opening 15, and it is then sufficient to apply a traction to ensure that the plate 50 (guided by the collar 53 and by the surrounding shape of the inside of the chamber 26) is arranged facing the seat 15. As seen in FIGS. 4 and 5, the shank 41 of the nipple 40 is withdrawn through the inner hole 51 of the plate 50 and the seat 15. The nipple 40 has its head 42 held in the chamber 26 by the plate 50 and its shank 41 protruding from the seat 15.

At this point, if assembling a single spoke 13 in an already complete wheel 10 (e.g. to replace a broken spoke), it is necessary to unscrew the false-spoke 16 from the nipple 40 and to screw in the spoke 13 in its place, said spoke 13 having previously been attached to the hub 11 by simply slipping the stem 31 in a suitable hole 20 on the hub 11, leaving the enlarged head 62 attached behind such a hole 20. It should be noted that the mutual screwing of spoke 13 and nipple 40 takes place by rotating not the spoke 13, which is locked on the hub 11, but rather by rotating the nipple 40, which is free to rotate.

On the other hand, if making a complete wheel 10, it is appropriate to hold the nipple 40 in a position facing away from the seat 15, through a suitable holding element, e.g. an elastic ring 17, and to then remove the false-spoke 16. In the same way, one should proceed to position all the nipples 40.

When the rim 12 is provided with all the nipples 40 in a facing position from the respective seats 15, the rims can be attached to the hub 11. For such a purpose, a hub 11 shall be also arranged with all the spokes 13 attached. One after another, all the spokes 13 are screwed into the respective nipples 40, until the wheel 10 is completed. When coupling of the spokes 13 to the nipples 40 is finished, the spokes are tensioned by rotating the nipples 40 using their polygonal surfaces 46.

In the above described assembling procedure, it is also possible to use a normal spoke 13 instead of the false-spoke 16 for assembly. Such a spoke 13, during this anomalous use thereof, must be free and not fixedly attached to the hub 11.

The stem 61 of the false-spoke 16, for reason of simplicity, can have a section which is the same as that of the spoke 13. Preferably, such a stem 61 has the smallest possible section, compatible with the requirement of keeping a certain stiffness as well as of including the threaded portion 74, so as to allow the maximum deviation of the plate 50. Moreover, it can be provided that the heads 42 and 142 of the nipple 40 and of the barrel 140, be cut along two ends, so as to obtain oblong sections. With these two provisions, seats 15 of a very small size can be formed in the rim 12.

The invention just described is, of course, susceptible of many different embodiments.

Figure 14:
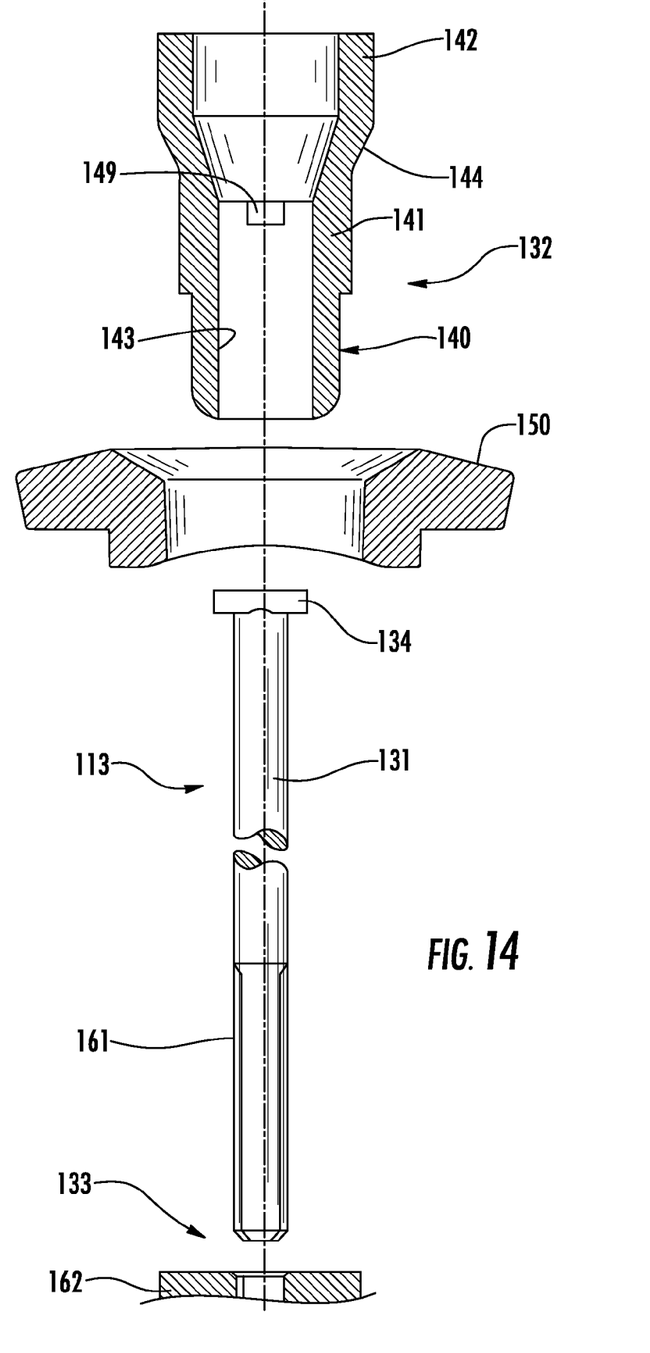
FIG. 14 is a section view of a spoke and its attachment elements, according to an alternative embodiment described below.
Figure 15:
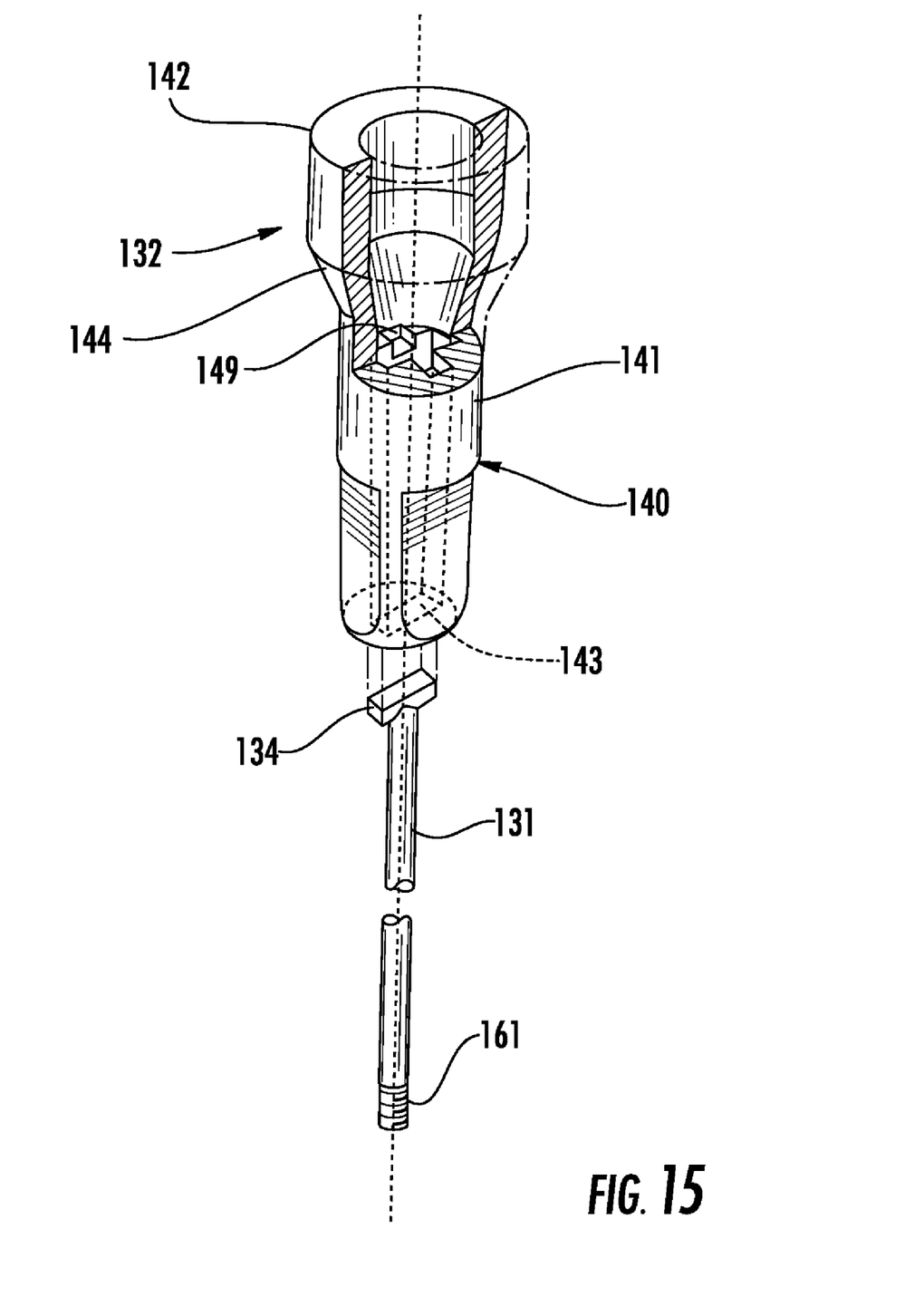
FIG. 15 is a perspective view in partial section of the spoke of FIG. 14.

In a different embodiment, illustrated in FIGS. 14 and 15, the spoke attachment element 132 towards the rim 12 comprises a plate 150 (equal to the plate 50) and a barrel 140. The barrel 140 has a shank 141, elongated in the direction of the spoke 113 to which it is coupled, and a head 142 protruding from the shank 141. The shank 141 is provided with an axial inner hole 143, with a rectangular section. The head 142 has a smooth conical contact surface 144 with the plate 150. The spoke 113 has a stem 131 and attaches to the barrel 140 through its own hammer-head 134, engaged in an attachment seat 149 formed transversally to the opening 143 of the barrel 140. The barrel 140 thus forms a protruding head of the spoke attachment element 132, which rests upon the plate 150.

Unlike the nipple, the barrel 140 allows only attachment and not tension adjustment. Consequently, the spoke 113 is provided at the other end (towards the hub 11) with a spoke attachment element 133 which allows such an adjustment, e.g. a threaded coupling between a threading 161 on the stem 131 and a threaded plate 162.

Figure 16:
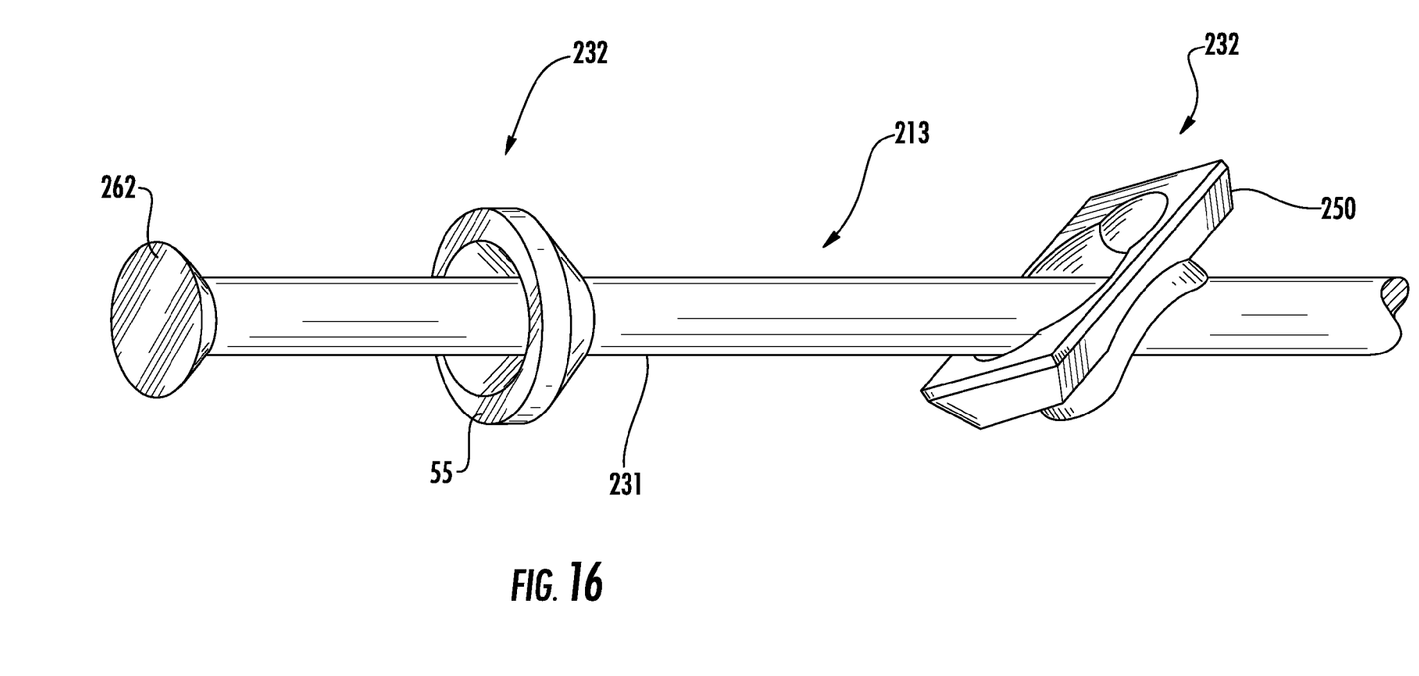
FIG. 16 is a perspective view of a spoke according to a different embodiment described below.

Another different embodiment is illustrated in FIG. 16. In this case, the spoke 213 is so to say inverted with respect to the spoke 13: indeed, the spoke attachment element 232 towards the rim 12 comprises—besides a plate 250 equal to the plate 50—a widened head 262, protruding with respect to the stem 231 and formed integral with it, whereas the spoke attachment element towards the hub (not shown) must allow tension adjustment, in the same way as the spoke attachment element 133 of the previous embodiment.

In all of the aforementioned embodiments, the plate can possibly be provided with an auxiliary washer 55, placed between the plate 50, 50', 250 and the head of the spoke attachment element 32, 132, 232. Such a washer 55 is illustrated in the embodiment of FIG. 16, but it can be provided in all the other embodiments. Its function is that of allowing a wider hole on the plate, so as to allow the plate itself to take on a more inclined position in the first condition.

What is claimed is:

1. A spoked wheel for a bicycle, comprising:
   a) a rim having two sides joined together on a base;
   b) a hub;
   c) a plurality of spokes tensioned between the rim and the hub, each provided with a spoke attachment element for attachment to the rim; and
   d) a plurality of seats formed as openings in the base of the rim, each seat to house one of said spoke attachment elements;
   wherein the shape and size of the spoke attachment elements and of the seats of the rim are such that:
      the spoke attachment element is suitable for taking up a first configuration in which its insertion through the seat is possible;
   the spoke attachment element inserted in the seat is in a second configuration in which at least one of the two sides of the rim prevents rotation of the spoke attachment element with respect to the seat due to contact between the spoke attachment element and at least one side of the rim;
   wherein the spoke attachment element comprises:
      a) a shank;
      b) a widened head formed on the spoke; and
      c) a contact plate provided with a hole;
   wherein the hole in the contact plate is narrow enough to prevent the slipping of the widened head from the contact plate, and the hole is large enough to allow the contact plate to take on both an attachment position substantially perpendicular to the spoke in the second configuration of the spoke attachment element, and an insertion position inclined with respect to the attachment position in the first configuration of the spoke attachment element.

2. The wheel of claim 1, wherein in the attachment position the shank is free to rotate with respect to the contact plate, about a longitudinal axis of the spoke.

3. The wheel of claim 1, wherein in the attachment position the contact plate cannot rotate with respect to the rim.

4. The wheel of claim 1, wherein the seat has an elongated shape.

5. The wheel of claim 4, wherein the shape of the seat is elongated in a transverse direction with respect to a circumferential extension of the rim.

6. The wheel of claim 1, wherein the widened head has a conical contact surface with the contact plate and the contact plate has a corresponding conical contact surface that mates with the widened head.

7. A spoked wheel for a bicycle, comprising:
   a) a rim having two sides joined together on a base;
   b) a hub;
   c) a plurality of spokes tensioned between the rim and the hub, each provided with a spoke attachment element for attachment to the rim; and
   d) a plurality of seats formed as openings in the base of the rim, each seat to house one of said spoke attachment elements;
   wherein the shape and size of the spoke attachment elements and of the seats of the rim are such that the spoke attachment element is suitable for taking up a first configuration in which its insertion through the seat is possible;
   the spoke attachment element inserted in the seat is in a second configuration in which at least one of the two sides of the rim prevents rotation of the spoke attachment element with respect to the seat due to contact between the spoke attachment element and at least one side of the rim;
   wherein the spoke attachment element comprises a contact plate provided with a hole;
   wherein the hole in the contact plate has at least one notch for receiving the spoke in the insertion position.

8. The wheel of claim 7, wherein the spoke attachment element comprises a widened head formed on the spoke and a contact washer between the head and the contact plate.

9. The wheel of claim 7, wherein the spoke attachment element of each spoke comprises a nipple, in adjustable screwing engagement with the spoke, the nipple including the head and a shank and being coupled to the contact plate.

10. The wheel of claim 7, wherein the spoke attachment element of each spoke comprises a barrel, in attaching engagement with the spoke, the barrel including the head and a shank and being coupled to the contact plate.

11. The wheel of claim 7, comprising a sealing gasket in each seat of the rim, around each spoke attachment element.

12. A method for assembling a spoked wheel of a bicycle comprising:
   providing a rim which includes two sides joined by a base and a plurality of seats formed from openings in the base, a hub, a plurality of spokes which include a first and second end, a plurality of plates including an inner hole, and a plurality of rim facing spoke attachment elements including a shank and a head having a contact surface;
   inserting each of the rim facing spoke attachment elements through a respective one of the openings in the base;
   positioning each of the contact plates at a first position angle relative to a respective one of the openings in the base and inserting each of the contact plates through the respective opening into an inner chamber of the rim;
   positioning each of the contact plates at a second position angle relative to the respective opening in the base so that contact between the contact plates and at least one of the sides of the rim prevents rotation of the contact plates with respect to the seat, and aligning the inner hole of each of the contact plates with a respective one of the seats of the rim;
   withdrawing the shank of each of the rim facing attachment elements through the inner hole of a respective one of the contact plates and through the respective opening in the base, and engaging the contact surface of the head of each of the rim facing attachment elements with a contact surface of the respective one of the contact plates;
   connecting the second end of each of the spokes to the hub and connecting a first end of each of the spokes to the rim facing attachment element.

13. The method according to claim 12, further comprising the step of connecting a sealing gasket to each of the openings in the base.

14. The method according to claim 12, further comprising the steps of
   providing each of the spokes with a threaded portion on the first end and providing each of the rim facing attachments with a tapped portion, and wherein the step of connecting the spokes includes the steps of mating the threaded and tapped portions and rotating each of the rim facing attachment elements to tension the spokes.

15. The method according to claim 14, further comprising the step of providing a polygonal peripheral surface on each of the shanks on an end opposite the head, and wherein the step of rotating each of the rim facing attachment elements includes the step of engaging the polygonal surface with a tool to apply torque.

16. The method according to claim 12, further comprising the steps of
providing each of the spokes with a threaded portion on the second end and providing the hub with a plurality of tapped portions, and wherein the step of connecting the spokes includes the steps of mating the threaded and tapped portions and rotating each of the rim facing attachment elements to tension the spokes.

17. The method according to claim 12, further comprising the step of attaching a holding element to each of the rim facing attachment elements subsequent to the step of withdrawing the shank and prior to the step of connecting the spokes.

* * * * *